No. 864,742. PATENTED AUG. 27, 1907.

B. JIROTKA.

LIQUID SPRAYER.

APPLICATION FILED MAR. 16, 1906.

3 SHEETS—SHEET 1.

Witnesses
Woldeman Haupt
Henry Hasper

Inventor
Bohumil Jirotka

No. 864,742. PATENTED AUG. 27, 1907.

B. JIROTKA.

LIQUID SPRAYER.

APPLICATION FILED MAR. 16, 1906.

3 SHEETS—SHEET 2.

Witnesses:

Eduard Franke

Carl Otto

Inventor:

Bohumil Jirotka

No. 864,742. PATENTED AUG. 27, 1907.

B. JIROTKA.

LIQUID SPRAYER.

APPLICATION FILED MAR. 16, 1906.

3 SHEETS—SHEET 3.

Witnesses
Woldemar Haupt
Henry Hasper.

Inventor
Bohumil Jirotka

UNITED STATES PATENT OFFICE.

BOHUMIL JIROTKA, OF BERLIN, GERMANY.

LIQUID-SPRAYER.

No. 864,742. Specification of Letters Patent. Patented Aug. 27, 1907.

Application filed March 16, 1906. Serial No. 306,432.

*To all whom it may concern:*

Be it known that I, Bohumil Jirotka, a subject of the Emperor of Austria, residing at Berlin, in the Empire of Germany, have invented a new and useful Liquid-Sprayer, of which the following is a specification.

The hitherto known liquid-sprayers with distributing disks present the following defects. If too large a quantity of the liquid is supplied to the distributing disk, the latter will discharge the liquid in too large drops, which produce a disagreeable moisture in the neighborhood. In proportion to the size of the apparatus the maximum quantity of liquid, which can be sprayed, is but moderate. The apparatus can not be regulated or only a little, since the quantity of the liquid to be sprayed depends upon the head.

My invention relates to improvements in such liquid-sprayers, whereby the said defects are avoided. The improved apparatus will be found to be suitable for moistening the air in rooms, for spraying medicines, scents etc. and for many other purposes.

The objects of my improvement are, first, to provide means for supplying the liquid to the underside of a distributing disk placed horizontally or nearly so; second, to provide a circular mantle around the distributing disk for collecting too large drops that may happen to be produced, so that the large drops may be partly further sprayed or they will be returned to the liquid-basin; third, if so preferred, to divide the circular mantle into a plurality of guiding blades, which allow the sprayed liquid to at once escape; fourth, where so preferred to provide plants around the circular mantle, partly as ornaments and partly for assisting the mantle in the separation of too large drops; and fifth, to provide means for regulating the speed of the distributing disk. I attain these objects by the construction illustrated in the accompanying drawings, in which—

Figure 1:
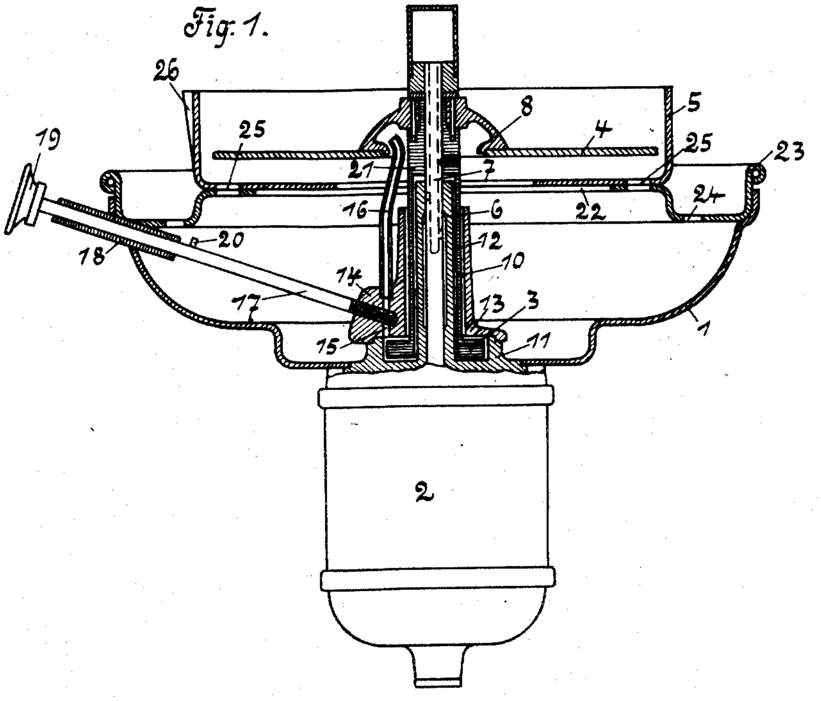
Figure 2:
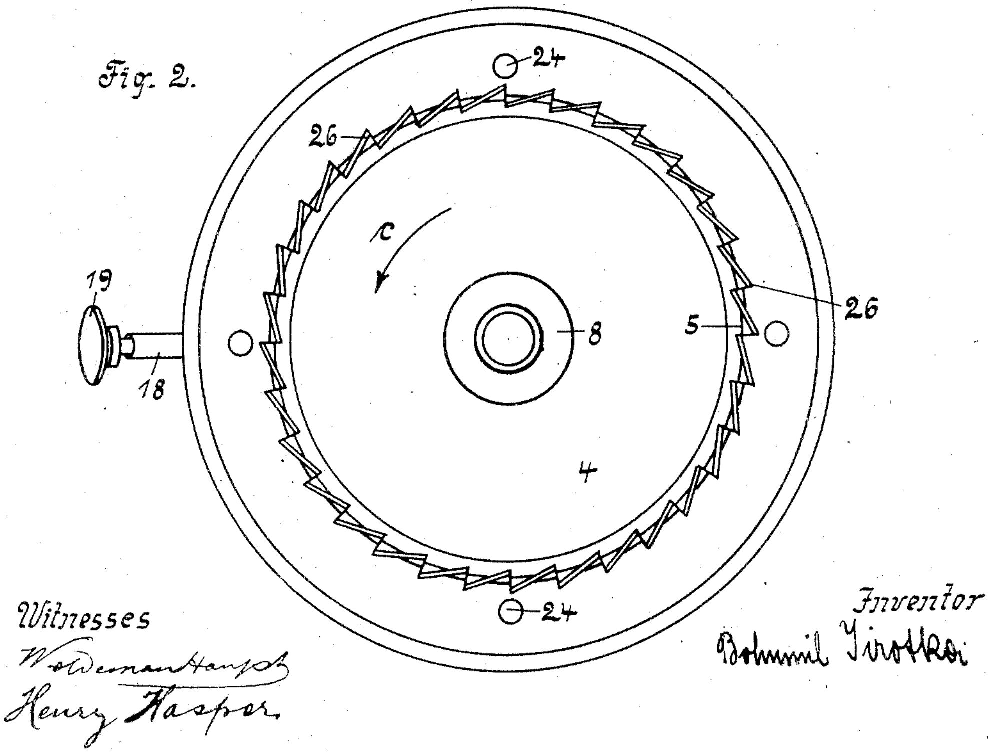
Figure 3:
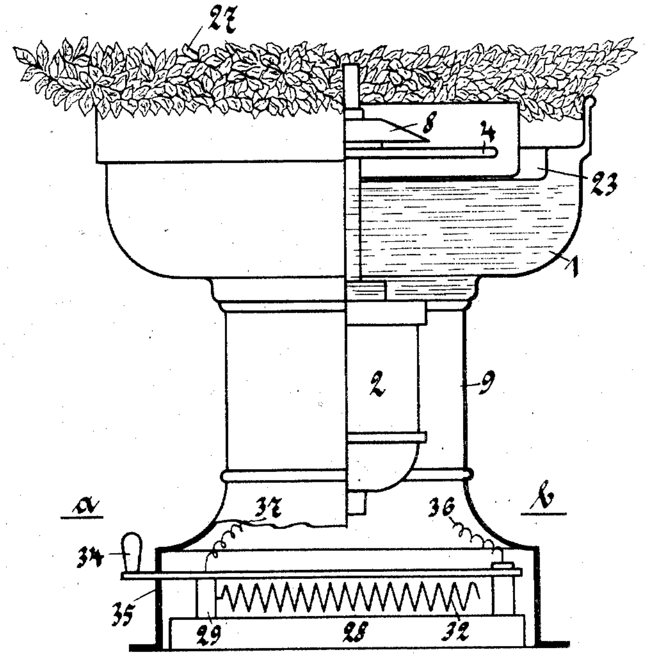
Figure 4:
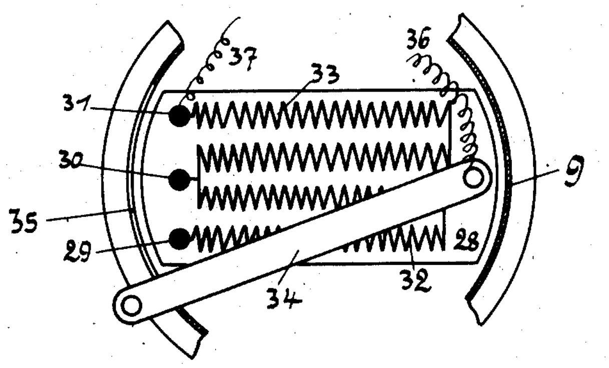
Figure 5:
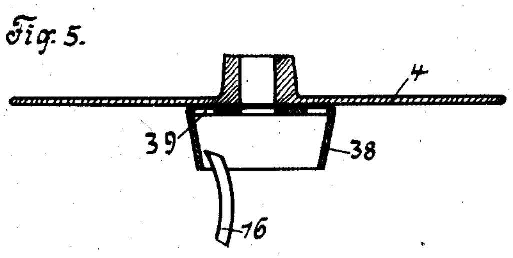
Figure 6:
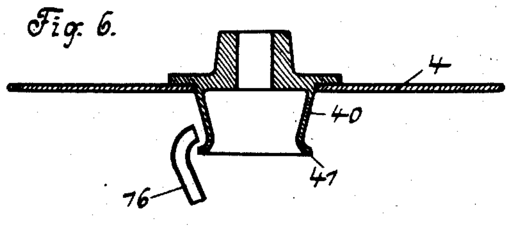

Figure 1 is in the upper part a vertical central section through an electrical liquid-sprayer and in the lower part an elevation of the electromotor, the lower support or standard being omitted, Fig. 2 is a plan of the same, Fig. 3 is partly an elevation and partly a vertical central section through a modification of the electrical liquid-sprayer in combination with the lower support or standard, Fig. 4 is a horizontal section through the same on the line *a*—*b* in Fig. 3 and shows the speed regulating device, and Figs. 5 and 6 show modifications of the distributing disk in vertical sections.

Similar characters of reference refer to similar parts throughout the several views.

In Figs. 1 and 2 I have shown a motor-driven liquid-sprayer which essentially consists of a liquid basin 1, an electromotor 2 a pump 3, a horizontal distributing disk 4 and a mantle 5. The electromotor 2 may be of any known construction and its upper bearing 6 is lengthened, so as to project above the level of the liquid in the basin 1. The armature shaft 7 projects from the upper bearing 6 and is adapted to support the horizontal distributing disk 4 by means of a bell 8, which latter forms a chamber above the distributing disk 4. The liquid-basin 1 is arranged to be supported by means of a suitable standard 9, as is for example shown at Fig. 3. The pump may be of any known and approved construction. In the present case it is assumed to be a centrifugal pump, the ladle wheel 3 of which is fastened at the lower end of a sleeve 10 and is made to turn on the bearing 6 within a casing formed by the side of the electromotor 2, a flange 11 thereon and the lower flange of a tube 12. The tube 12 projects above the level of the liquid and is provided with a hole 13, through which liquid can be sucked into the casing of the centrifugal pump. The tube 12 and its flange may be cast in one piece with a boss 14, which is provided with a vertical channel 15 for the discharge of liquid from the centrifugal pump. A small tube 16 is inserted in the upper mouth of the channel 15 and serves for conducting the liquid to the cavity of the bell 8. A regulating device of any known construction is preferably disposed for increasing and decreasing at will the area of the channel 15 and thereby also the quantity of the discharged liquid. This regulating device is shown as consisting of an inclined spindle 17, which is guided in a suitable bearing 18 and engages with its lower screw-threaded end in a corresponding thread in the boss 14. This spindle 17 can be turned by means of a hand-wheel 19 and is preferably provided with a pin 20, to prevent it from getting out of the boss 14. The said sleeve 10 may be made in one piece with a nave 21, on which the said bell 8 is fastened. It will be seen, that in this manner the liquid is prevented from getting into the electromotor 2. A circular mantle 5 surrounds the distributing disk 4 and is shown as made in one piece with an annular bottom 22, which may be fastened on a special annular box 23. The latter is arranged to rest on the widened rim of the liquid-basin 1 and is provided with several draining holes 24, 24. Besides the large central opening the bottom 22 may be provided near its periphery with several draining holes 25, 25. Where so preferred, the mantle 5 may be divided by vertical slits into a number of sections, which are so bent as to form a kind of guiding blades 26, 26, as is clearly shown at Figs. 1 and 2. These guiding blades 26, 26 should be inclined to the periphery of the disk 4 and should conduct any liquid outwardly in a direction opposite to that of the arrow *c* in Fig. 2, in which the disk 4 is made to rotate. The annular box 23 is arranged for receiving and holding plants 27, either natural or artificial. It is immaterial, how the box 23 and the liquid-basin 1 are shaped. Fig. 3 shows for example modifications of these two parts.

A device for regulating the speed of the electromotor 2 is preferably disposed within the standard 9 on the floor. It may consist of a board 28 with say three contact pieces 29, 30 and 31, two resistances 32 and 33 and a switch 34, which latter is movable in a suitable slot 35 in the standard 9. The switch 34 may be connected with the part 36 of the respective circuit of the electromotor 2 and one contact piece 31 may be connected with the other part 37 of the said circuit.

The motor-driven liquid-sprayer is operated as follows: The switch 34 is shown in Fig. 4 as being out of contact with the contact piece 29, so that the circuit of the electromotor 2 is broken. When the switch 34 is placed on the contact piece 29, the said circuit will be closed, so that the electromotor 2 is now started. It will run at a low speed, since the maximum resistance is inserted in the circuit, the current having to pass say through the line 36, the switch 34, the contact piece 29, the resistance 32, the intermediate contact-piece 30, the second resistance 33, the third contact piece 31 and the line 37. On placing the switch 34 on the intermediate contact piece 30, only half the resistance will be left in the circuit, so that the speed of the electromotor will be increased. Obviously the maximum speed of the electromotor 2 will be attained by placing the switch 34 on the third contact piece 37, when the whole resistance will be withdrawn from the circuit. Of course the distributing disk 4 and the ladle wheel 3 will partake in the revolution of the armature shaft 7, so that liquid will be sucked into the pump through the hole 13 and from the pump it will be discharged through the channel 15 and the small tube 16, provided, that the spindle 17 has been withdrawn to permit the passage of the liquid. The liquid will therefore meet the inside of the bell 8 and will collect in the annular space above the internal flange of the bell, see Fig. 1. Any excess of the liquid will be compelled by its own weight to at once drop on the bottom 22, from whence it will return to the basin 1 through the large central opening or the small draining holes 25, 25. The liquid flowing out of the cavity of the bell 8 in a layer of uniform thickness will adhere to the underside of the distributing disk and will move radially thereon under the influence of its centrifugal force. Now since the circumference on the disk 4 continually increases from the inner circumference of the flange of the bell 8 to the outer periphery of the disk 4, it follows, that the thickness of the layer of liquid on the underside of the disk 4 will continuously decrease. This means, that the liquid will be finely divided on leaving the periphery of the disk 4, so that no large drops are permitted to be thrown off. Moreover the circular mantle 5 will catch any too large drops, that may happen to be still formed, and will return the same to the basin 1.

If the mantle 5 is divided into a series of guiding blades 26, 26 (see Figs. 1 and 2), of course only the nebulized liquid will be permitted to escape through the slits in a direction opposite to that of the distributing disk 4, while all the large drops, if any are produced, will be caught by the guiding blades 26, 26 and be conducted downwards into the basin 1. The spray will distribute itself in the ambient air and will produce the desired effect, which has already been indicated above. The plants 27 in the annular box 23 not only serve as ornaments, but will also catch any large drops still left and will return them to the basin 1.

It is evident, that the quantity of liquid to be sprayed can be regulated by means of the spindle 17, it increasing or decreasing the area of the channel 15, and also the said quantity can be regulated by increasing or decreasing the speed of the electromotor. Thus the quantity of liquid to be sprayed can be determined at will and within wider limits, than was hitherto the case with known liquid-sprayers, in which the quantity of sprayed liquid depends upon the respective head of liquid.

The chief feature of the new liquid-sprayer is, that the liquid is supplied to the underside of the distributing disk, so that the adhesion of the liquid on the disk will permit only the proper quantity of liquid to be sprayed, as the excess will be obliged by its own weight to drop and to return to the basin 1. The bell 8 is also very useful for the uniform distribution of the liquid. It is shown as disposed above the underside of the disk 4, but it may be also disposed beneath the said underside, if so preferred. Figs. 5 and 6 show two such modifications of the bell 8. In Fig. 5 the liquid is discharged from the small tube 16 to the inside of a conical bell 38, which diverges upwards and is provided close to the disk 4 with a plurality of holes 39, 39. It is evident, that during the rotation of the disk 4 the liquid will be distributed over the whole inside of the bell 38 and that after the passage of the liquid through the several holes 39, 39 it will be moved along the underside of the disk 4 to without by its centrifugal force and will be uniformly sprayed, the same as before. In Fig. 6 on the contrary the liquid is discharged from the small tube 16 to the outside of a bell 40 above its flange 41, but the effect will be substantially the same as before.

The motor-driven liquid-sprayer may be varied in many respects without departing from the spirit of my invention. The motor 2 may be of any other known construction. The liquid basin 1 and the standard 9 may be shaped otherwise and may be ornamented. The distributing disk 4 may be a little inclined.

What I claim as my invention, and desire to secure by Letters Patent, is—

1. In a liquid-sprayer, the combination with a liquid-basin, of a shaft mounted to turn in said liquid-basin, a pump, means for driving said shaft and said pump, a distributing disk provided in its center with a bell, a discharge tube from said pump and adapted to supply the liquid to said bell, said bell being adapted to conduct the liquid to the underside of said distributing disk.

2. In a liquid-sprayer, the combination with a liquid-basin, of an upright shaft mounted to turn in said liquid-basin, a pump, means for driving said upright shaft and said pump, a distributing disk fastened at the upper end of said upright shaft and provided in its center with a bell, a discharge tube from said pump and adapted to supply the liquid to said bell, said bell being adapted to conduct the liquid to the underside of said distributing disk.

3. In a liquid-sprayer, the combination with a liquid-basin, of a shaft mounted to turn in the center of said liquid-basin and projecting upwards, a pump adapted to suck the liquid from said liquid-basin, means for driving said shaft and said pump, a distributing disk fastened at the upper end of said shaft and provided in its center with a bell, a discharge tube from said pump and adapted to supply the liquid to said bell, said bell being adapted to conduct the liquid to the underside of said distributing disk.

4. In a liquid-sprayer, the combination with a liquid-basin, of a shaft mounted to turn in the center of said liquid-basin and projecting upwards, a pump adapted to suck the liquid from said liquid-basin, means for driving said shaft and said pump, a distributing disk fastened at the upper end of said shaft and provided in its center with a bell, a discharge tube from said pump and adapted to supply the liquid to said bell, said bell being adapted to conduct the liquid to the underside of said distributing disk, and a mantle surrounding said distributing disk and adapted to catch too large drops and to return them to said circular liquid-basin.

5. In a liquid-sprayer, the combination with a liquid-basin, of a shaft mounted to turn in the center of said liquid-basin and projecting upwards, a pump adapted to suck the liquid from said liquid-basin, means for driving said shaft and said pump, a distributing disk fastened at the upper end of said shaft and provided in its center with a bell, a discharge tube from said pump and adapted to supply the liquid to said bell, said bell being adapted to conduct the liquid to the underside of said distributing disk, and a mantle surrounding said distributing disk and divided by a plurality of slits into a corresponding plurality of bent guides, which are inclined to the periphery of said distributing disk and are adapted to catch too large drops and to return them to said liquid-basin.

6. In a liquid-sprayer, the combination with a liquid-basin, of a shaft mounted to turn in the center of said liquid-basin and projecting upwards, a pump adapted to suck the liquid from said liquid-basin, means for driving said shaft and said pump, a distributing disk fastened at the upper end of said shaft and provided in its center with a bell, a discharge tube from said pump and adapted to supply the liquid to said bell, said bell being adapted to conduct the liquid to the underside of said distributing disk, means for regulating the supply of liquid from said pump, and a mantle surrounding said distributing disk and divided by a plurality of slits into a corresponding plurality of bent guides, which are inclined to the periphery of said distributing disk and are adapted to catch too large drops and to return them to said liquid-basin.

7. In a liquid-sprayer, the combination with a standard, of a liquid-basin on said standard, a motor in said standard and provided with a shaft, which projects upwards through the center of said liquid-basin, a pump driven by said motor and adapted to suck the liquid from said liquid-basin, a distributing disk fastened at the upper end of said shaft, a discharge tube from said pump and adapted to supply the liquid to the underside of said distributing disk, an annular box on the periphery of said liquid-basin and provided with draining holes, and a mantle on the internal periphery of said annular box and surrounding said distributing disk and adapted to catch too large drops and to return them to said liquid-basin.

8. In a liquid-sprayer, the combination with a standard, of a liquid-basin on said standard, an electromotor in said standard and provided with a lengthened shaft-bearing, which projects through the center of said liquid-basin to a point above the level of the liquid, also provided with an armature shaft, which projects above the lengthened shaft-bearing, a pump driven by said electromotor and adapted to suck the liquid from said liquid-basin, a distributing disk fastened at the upper end of said armature shaft, a discharge tube from said pump and adapted to supply the liquid to the underside of said distributing disk, an annular box on the periphery of said liquid-basin and provided with draining holes, and a mantle on the internal periphery of said annular box and surrounding said distributing disk and adapted to catch too large drops and to return them to said liquid-basin.

In testimony whereof I have signed my name to this specification in the presence of two subscribing witnesses.

BOHUMIL JIROTKA.

Witnesses:
WOLDEMAR HAUPT,
HENRY HASPER.